(12) United States Patent
Liu et al.

(10) Patent No.: US 8,668,373 B2
(45) Date of Patent: Mar. 11, 2014

(54) BACKLIGHT MODULE HAVING A THINNED STUCTURE

(71) Applicant: AU Optronics Corporation, Hsin-Chu (TW)

(72) Inventors: Yung Chih Liu, Hsin-Chu (TW); Chih-Shun Fan, Hsin-Chu (TW); Yu-Sen Jang, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 0 days.

(21) Appl. No.: 13/783,341

(22) Filed: Mar. 3, 2013

(65) Prior Publication Data

US 2013/0301298 A1    Nov. 14, 2013

(30) Foreign Application Priority Data

May 8, 2012    (TW) .............................. 101116421 A (51) Int. Cl.
*F21V 7/04*    (2006.01)
*G02F 1/1333*    (2006.01)

(52) U.S. Cl.
USPC ............. 362/634; 362/614; 362/615; 349/63; 349/65

(58) Field of Classification Search
USPC ..................... 313/498–512; 349/62–63, 65; 362/614–615, 608, 296.01, 613
See application file for complete search history.

(56) References Cited

U.S. PATENT DOCUMENTS

| | | | | |
|---|---|---|---|---|
| 8,021,032 | B2* | 9/2011 | Pei ................................ | 362/612 |
| 8,506,153 | B2* | 8/2013 | Chang et al. .................. | 362/626 |
| 8,511,879 | B2* | 8/2013 | Im ................................ | 362/609 |

FOREIGN PATENT DOCUMENTS

| | | |
|---|---|---|
| TW | 200643560 | 12/2006 |
| WO | 2006087863 | 8/2006 |

* cited by examiner

*Primary Examiner* — Tracie Y Green
(74) *Attorney, Agent, or Firm* — McClure, Qualey & Rodack, LLP (57) ABSTRACT

A thin backlight module includes a light guide plate, a light source module, and an adhesive layer. The light guide plate has a light-entering end and a bottom, wherein a plurality of troughs spaced at intervals are formed on a portion of the bottom connected to the light-entering end. The light source module is disposed corresponding to the light-entering end and includes a substrate and a plurality of light sources. The light sources are disposed on the substrate and distributed along the light-entering end, wherein each of the light sources corresponds to an interval between the adjacent troughs. The adhesive layer is attached to the substrate, faces the bottom of the light guide plate, and extends into the troughs to be attached to the light guide plate.

9 Claims, 5 Drawing Sheets

BACKLIGHT MODULE HAVING A THINNED STUCTURE

BACKGROUND OF THE INVENTION

1. Field of the Invention

The present invention generally relates to a backlight module. Particularly, the present invention relates to a light guide plate having a thinned structure.

2. Description of the Prior Art

Backlight module has been extensively applied to various electronic products having display function, such as laptop, tablet, television, mobile phone, and other communication devices. Because of technology improvement in display industry and life demand, the electronic products having display function are becoming smaller, thinner, and/or lighter. For the purpose of smallness, thinness, and/or lightness, the outline and the interior components may require adjustments or improvements in order to have the same or even better efficiency under a limited volume or space.

Figure 1A:
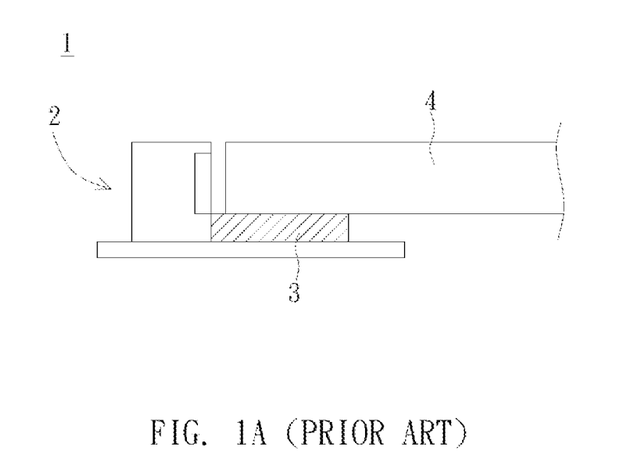
FIGS. 1A-1B are schematic views of the conventional backlight module.
Figure 1B:
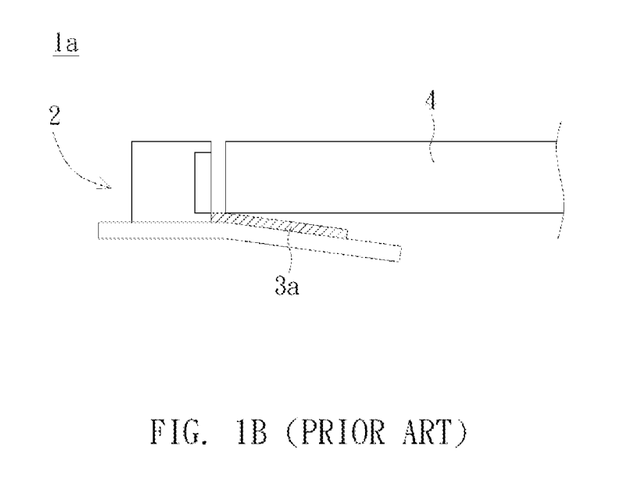

As FIG. 1A shows, in the conventional backlight module 1, the light guide plate 4 and the light source module 2 are attached to each other by a tape 3. For the purpose of thinning the backlight module 1, the conventional tape 3 is replaced by a thinner tape 3a, as FIG. 1B shows. However, a smaller thickness of the tape 3a leads to reduced ability of attaching the light guide plate 4 to the light source module 2, which accordingly results in poor alignment of light source(s) and the light guide plate 4, so that optical performance of the light guide plate 1 is affected; for example, hot spots near the light source(s) easily happened.

SUMMARY OF THE INVENTION

It is an object of the present invention to provide a backlight module having a thinned structure.

It is another object of the present invention to provide a backlight module, wherein the light source(s) and the light guide plate are better aligned.

It is another object of the present invention to provide a backlight module, wherein the light plate therein is better secured.

The present invention provides a backlight module including a light guide plate, a light source module, and an adhesive layer. The light guide plate has a light-entering end and a bottom, wherein a portion of the bottom connected to the light-entering end is formed with a plurality of troughs spaced at intervals for the adhesive layer at least partially disposed therein to connect the light guide plate and the light source module, to secure the light guide plate relative to the light source module, and to reduce space in the backlight module occupied by the adhesive layer. In addition, when a portion of the light guide plate connected to the light-entering end is formed as a wedge-shaped portion, the trough is at least partially or completely located below the wedge-shape portion.

The light-entering end of the light guide plate corresponds to the light source module. The light source module includes a substrate and a plurality of light sources disposed thereon, wherein the substrate extends along the light-entering end and parallelly extends below the bottom; the plurality of light sources disposed on the substrate are distributed along the light-entering end while a light-emitting face of the light source faces the light-entering end and projects thereon. In addition, each of the light sources corresponds to an interval between the adjacent troughs.

With reference to a z axis perpendicular to the horizontal, a position of the trough on the z axis is lower than a position of the lower edge of the projection area of the light-emitting face on the light-entering end on the z axis; in other words, the trough is located below the projection area. On the other hand, light emitted from the light-emitting face of the light sources and entering the light guide plate has a range of 110-degree opening angle on an x-y plane, wherein the trough is located outside the range and has a depth of 0.5-2 mm in a direction away from the light-entering end and parallel to the bottom.

The adhesive layer is attached onto a face of the substrate facing the bottom and extends into the troughs to be attached to the light guide plate. The adhesive layer includes a connecting portion and a plurality of finger portions, wherein the connecting portion is disposed laterally at a rear side of the light sources relative to the light-entering end, the finger portions respectively extend from the connecting portion and protrude into the corresponding troughs, which have the depth of 0.5-2 mm, through the adjacent light sources.

A thickness of the adhesive layer is 0.06-0.085 mm; a height of the trough in a direction perpendicular to the bottom is less than the thickness of the adhesive layer, so that the finger portions of the adhesive layer protrude out of the troughs and are attached to the light guide plate. When the thickness of the adhesive layer is 0.06 mm, the height of the trough is less than 0.06 mm; when the thickness of the adhesive layer is 0.085 mm, the height of the trough is less than 0.085 mm.

DETAILED DESCRIPTION OF THE PREFERRED EMBODIMENT

Figure 2A:
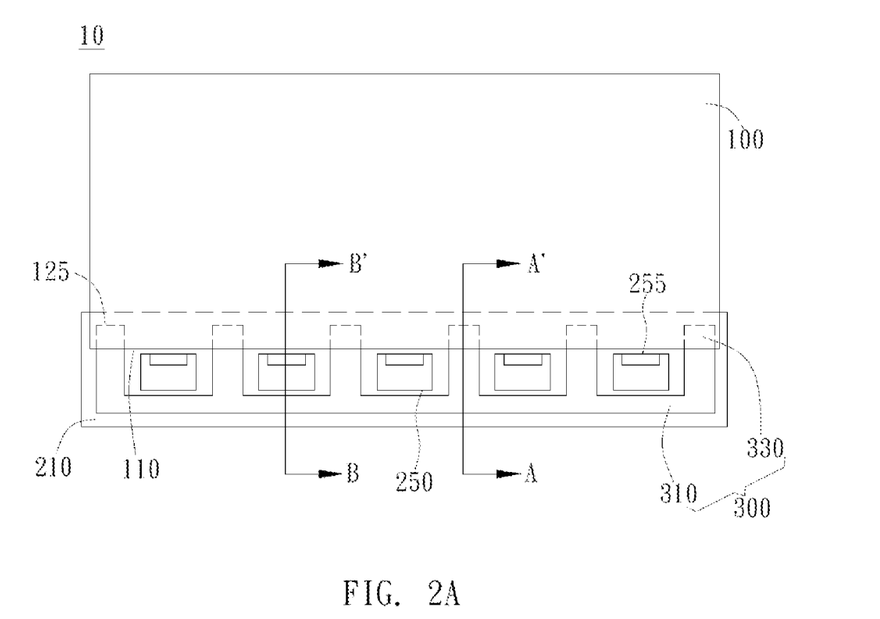
FIG. 2A is a schematic view of the embodiment of the backlight module of the present invention.
Figure 2B:
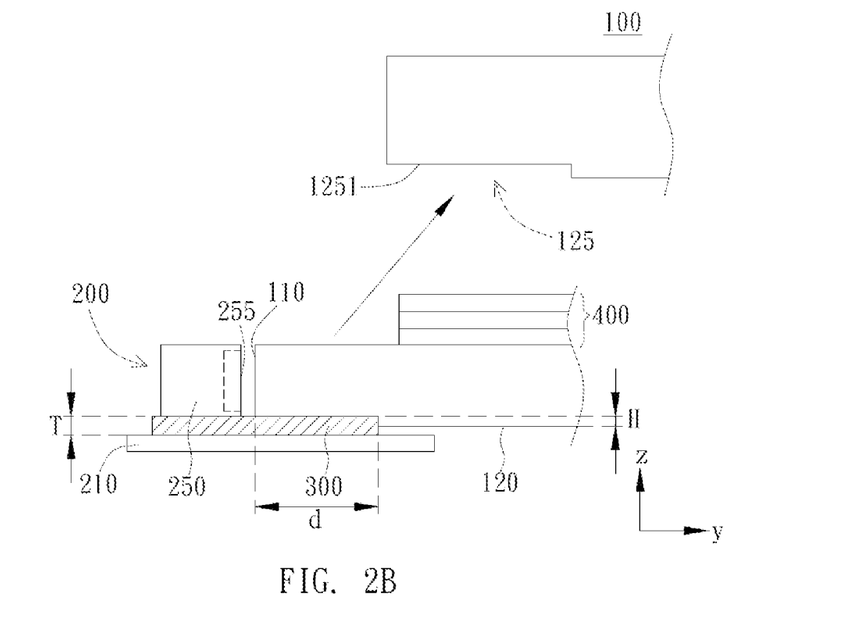
FIG. 2B is a cross-sectional view of the backlight module along the A-A' line shown in FIG. 2A.
Figure 2C:
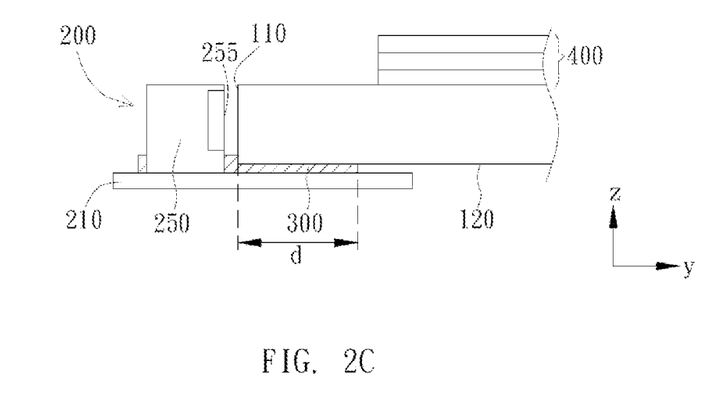
FIG. 2C is a cross-sectional view of the backlight module along the B-B' line shown in FIG. 2A.

As the embodiment shown in FIGS. 2A-2C, the backlight module 10 of the present invention includes a light guide plate 100, a light source module 200, and an adhesive layer 300 and may further include optical film(s) 400 disposed on the light guide plate 100, wherein the backlight module 10 is preferably an edge-lighting backlight module. The light guide plate 100 has a light-entering end 110 and a bottom 120, wherein the light-entering end 110 corresponds to the light source module 200. The light source module 200 includes a substrate 210 and a plurality of light sources 250 disposed thereon, wherein the substrate 210 may be, for example, a flexible or rigid circuit board for supporting light source(s) and/or circuit. The substrate 210 preferably has a striped shape, extends along the light-entering end 110 and has a portion parallelly extending under the bottom 120. The plurality of light sources 250 are distributed along the light-entering end 110 and is preferably arranged in a line.

On the other hand, there are a plurality of troughs 125 spaced at intervals and formed on a portion of the bottom 120 connected to the light-entering end 110. The adhesive layer 300 of the backlight module 10 of the present invention is attached to a face of the substrate 210 facing the bottom 120 and extends into the troughs 125 to be attached to the light guide plate 100. In other words, by means of the troughs 125 formed on the bottom 120 of the light guide plate 100, the adhesive layer 300 can be at least partially disposed therein to connect the light guide plate 100 and the light source module 200, so that the relative position of the light guide plate 100 and light source module 200 can be fixed. In addition, since the adhesive layer 300 is at least partially disposed in the troughs 125, the through 125 having a height neutralizes a thickness of the adhesive layer 300; in other words, a height of the portion of the adhesive layer protruding out of the trough 125 (i.e. "T minus H") is smaller than the thickness of the adhesive layer 300 (i.e. "T"), accordingly reducing a space in the backlight module 10 occupied by the adhesive layer 300. In the embodiment, the trough 125 preferably has a proper depth "d" in a direction away from the light-entering end 110 and parallel to the bottom 120 and a proper height "H" in a direction perpendicular to the bottom 120 (described later) for the adhesive layer 300 disposed therein without interfering optical performance of the light guide plate 100. For example, the adhesive layer 300 may be the double-sided adhesive tape, optical cement, or other glue.

Figure 3:
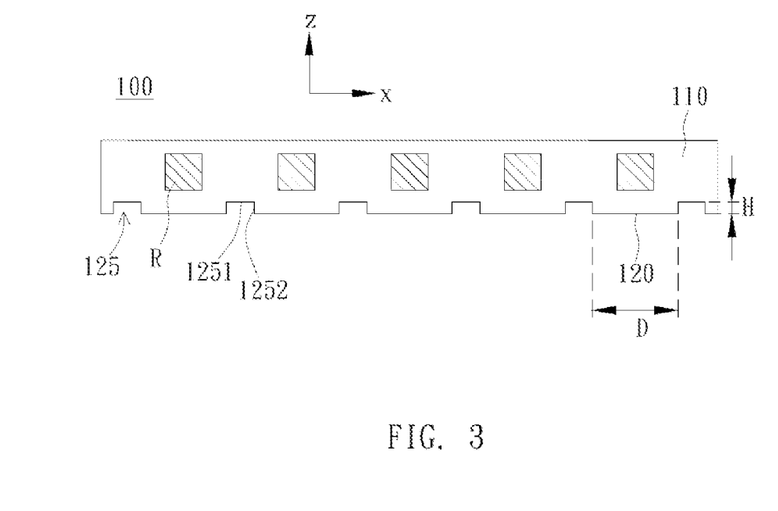
FIG. 3 is a front view of the embodiment of light guide plate of the present invention.

As FIG. 2A-2C show, each of the light sources 250, which are distributed along the light-entering end 110, has a light-emitting face 255 facing the light-entering end 110. The light-emitting face 255 has a projection area on a plane on which the light-entering end 110 lies, wherein the projection area completely falls within the light-entering end 110. The light-entering end 110 of the light guide plate 100 and the projection area "R" of the light-emitting face 255 thereon are further demonstrated in FIG. 3. Furthermore, as shown in FIG. 2A, each of the light sources 250 preferably corresponds to an interval between the adjacent troughs 125. As such, the size, the number, and the position of the troughs 125 are designed with reference to the predetermined size, number, and the location of the light sources 250. In point of the light sources preferably corresponding to the interval between the adjacent troughs 125, as demonstrated in detail along with FIG. 2C, which shows the cross-sectional view of the backlight module along the B-B' line passing the light source 250 shown in FIG. 2A, no trough 125 is formed under a portion of the light-entering end 100 to which the light sources 250 correspond. In addition, as FIG. 3 shows, the troughs 125 are located below the projection area "R" of the light-emitting face 255 on the light-entering end 110, and are formed at two opposite sides of the projection area "R" on the bottom 120.

Figure 4:
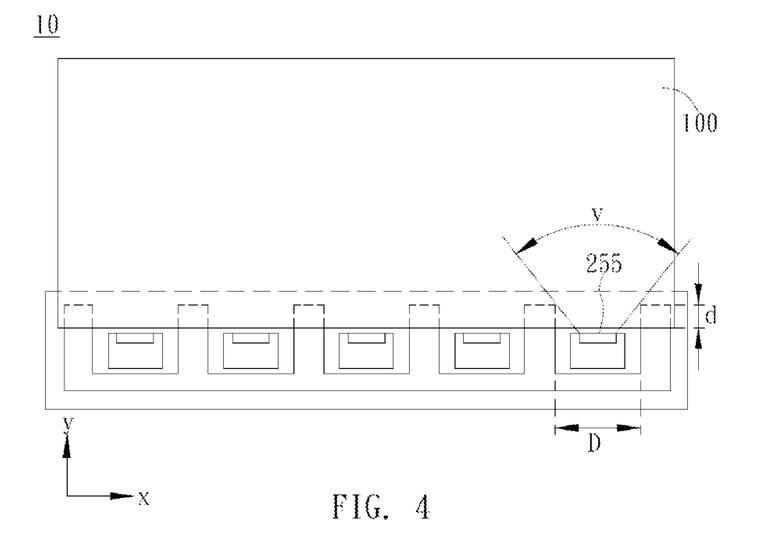
FIG. 4 is another schematic view of the embodiment of the backlight module of the present invention.

As mentioned above, the light-emitting face 255 of the light source 250 has the projection area "R" on the light-entering end 110; however, a range of the light emitted from the light-emitting face 255 striking the light-entering end 110 is not always equal to the projection area "R" mentioned above. Moreover, the incidence area on the light-entering end 110 is preferably greater than the projection area "R", wherein the projection area "R" is within the incidence area. The light entering the light guide plate 100 from the light-entering end 110 may continuously proceed in its incidence direction, as FIG. 4 shows. Since the incidence area is greater than the projection area "R", as shown in FIG. 3, there is preferably a vertical distance existing between the lower edge of the projection area "R" and a top face 1251 of the trough 125, i.e. with reference to the z axis perpendicular to the horizontal, a position of the trough 125 on the z axis is lower than a position of the lower edge of the projection area "R". In other words, the trough 125 is located below the projection area "R" of the light emitting face 255 on the light entering end 110 and preferably located outside the projection area "R", so that any influence of the troughs 125 of the light guide plate 100 on light path can be reduced or avoided. In addition, the above-mentioned effect could be achieved by forming the troughs 125 having the proper height "H" and/or by designing the adhesive layer 300 having a proper thickness "T" in cooperation with the light-emitting face 255 of the light source 250, as shown in FIGS. 2B-2C.

In order to reduce or avoid possible influence of the troughs 125 on the light path, in the preferred embodiment of the present invention, as shown in FIG. 4, the light emitted from the light-emitting face 255 of the light source 250 and entering the light guide plate 100 has a range of opening angle "v"; the opening angle "v" could lie on an x-y plane or a plane having an included angle with the x-y plane in a situation that for example, the light has a proceeding direction which is obliquely upward or downward. The range of the opening angle "v" may differ depending upon a distance between the light source 250 and the light guide plate 100 or a distance between the light-emitting face 255 and the light-entering end 110. In the embodiment of the present invention, the range of the opening angle "v" is preferably 110 degrees while the trough 125 is located outside the range. In other words, the trough 125 is not on the light path after the light enters the light guide plate 100. The effect shown in FIG. 4 could be achieved by forming the trough 125 having the proper depth "d" and/or by designing a distance "D" between the adjacent troughs 125, in cooperation with the light-emitting face 255 and/or the distance between the light-emitting face 255 and the light-entering end 110. In the embodiment of the present invention, the depth "d" of the troughs 125 is preferably between 0.5 mm and 2 mm.

Figure 5:
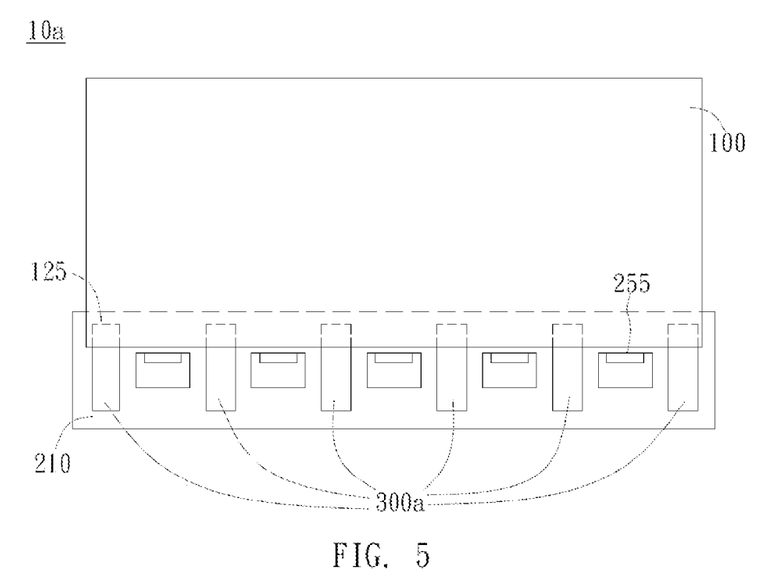
FIG. 5 is a schematic view of another embodiment of the backlight module of the present invention.

As shown in FIG. 2A, the adhesive layer 300 preferably includes a connecting portion 310 and a plurality of finger portions 330. The connecting portion 310 is disposed laterally at a rear side of the light sources 250 relative to the light-entering end 110. The finger portions 330 respectively extend from the connecting portion 310 and protrude into the corresponding troughs 125 through the adjacent light sources 250, wherein the connecting portion 310 is connected to the finger portions 330, so that the adhesive layer 300 is in an integral form. A distance between the adjacent finger portions 330 and/or a length of the finger portion 330 are designed with reference to the size and the position of the troughs 125 and the light sources 250, but are not limited thereto. In other embodiments, such as the backlight module 10a shown in FIG. 5, the adhesive layer 300 may be composed of a plurality of independent finger-like adhesive portions, which respectively protrude into the corresponding troughs 125.

In respect of reducing the thickness of the backlight module 10 by reducing thickness of parts of the backlight module 10, the adhesive layer 300 preferably has the proper thickness "T". On the one hand, the adhesive layer 300 having the proper thickness "T" assists the light source module 200 and the light guide plate 100 in assembling and adhering during manufacturing the backlight module 10; on the other hand, the adhesive layer 300 having the proper thickness "T" has a greater value of tensile strength, so that it is able to avoid or reduce the possibility of the light guide plate 100 peeling off the adhesive layer 300 in the backlight module 10.

A relation between the adhesive layer 300 and the light guide plate 100 has been tested and shown in the following example:

| Thickness of the adhesive layer | Value of tensile strength (Newton, N) Test (the number of times) | | | | |
|---|---|---|---|---|---|
| | 1 | 2 | 3 | 4 | Average |
| 0.085 mm | 7.50 | 9.625 | 8.40 | 7.875 | 8.35 |
| 0.06 mm | 6.725 | 4.325 | 6.525 | 4.725 | 5.575 |

It should be noted that the tested value of tensile strength may differ due to material of the adhesive layer and/or material of a binding agent on the surface of the adhesive layer, which may differ depending upon different backlight module.

In the embodiment of the present invention, the finger portion 330 of the adhesive layer 300 preferably protrudes into the corresponding trough 125 and occupies completely the space in the trough 125, as shown in FIG. 2B. Accordingly, in respect of possible factors affecting the light path, it preferably takes the thickness "T" of the adhesive layer 300 together with the influence of the trough 125 mentioned above into consideration. For example, as mentioned above, the adjacent troughs 125 shown in FIGS. 2B and 3 located below the projection area "R" of the light-emitting face 255 on the light-entering end 110 are formed at two opposite sides of the projection area "R" and are preferably outside the projection area "R"; that is, a height of the lower edge of the light-emitting dace 255 with reference to the z axis is preferably greater than the thickness "T" of the adhesive layer 300.

Collectively speaking, for the purpose of avoiding influence on the light path in the light guide plate 100 and thinning the backlight module 10, the thickness "T" of the adhesive layer 300 in the present invention is preferably between 0.06 mm and 0.085 mm, which assists the light source module 200 and the light guide plate 100 in assembling and adhering during the manufacturing of the backlight module 10 and prevents the light guide plate 100 and the adhesive layer 300 in the backlight module 10 from peeling off. On the other hand, the troughs 125 are formed to have the height "H" and the proper depth "d" for the finger portions 330 protruding thereinto, wherein the height "H" is smaller than the thickness "T".

For example, when the thickness "T" of the adhesive layer 300 is 0.085 mm, the height "H" of the trough 125 is preferably less than 0.085 mm; when the thickness "T" of the adhesive layer 300 is 0.06 mm, the height "H" of the trough 125 is preferably less than 0.06 mm. In other words, the adhesive layer 300 merely has a portion of thickness "T", instead of the whole thickness "T", occupying the space in the backlight module 10, wherein the portion of the adhesive layer 300 protruding out of the trough 125 has the thickness substantially equal to "T minus H" (i.e. T-H), as shown in FIG. 2B. The thickness (T-H) of the portion of adhesive layer 300 protruding out of the trough 125 is preferably 0-0.2 mm. In addition, the protruding portion of the finger portion 330 having the thickness (T-H) and the elasticity of the adhesive layer 300 help the light guide plate 100 and the substrate 210/light source module 200 approaching to each other in response to a force. That is, the adhesion between the light guide plate 100 and the substrate 210 is improved.

Figure 6A:
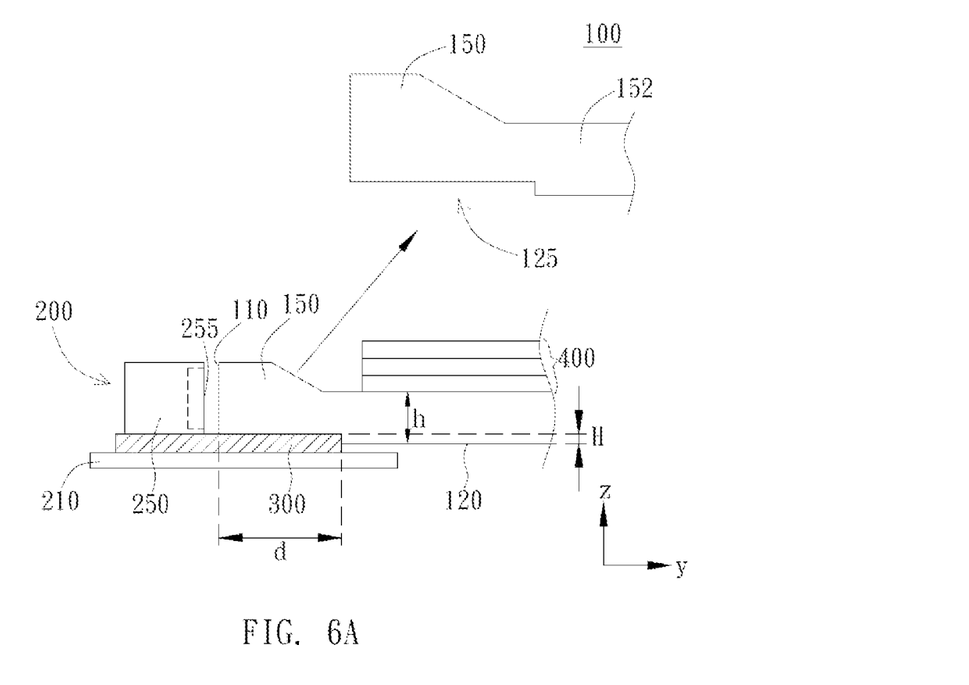
FIGS. 6A-6B are schematic views of another embodiment of the backlight module of the present invention.
Figure 6B:
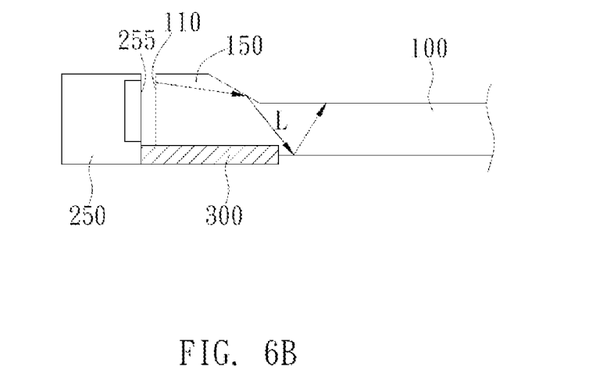

In another embodiment, as shown in FIG. 6A, the light guide plate 100 of the backlight module 10 is preferably a wedge-shaped light guide plate. A portion of the light guide plate 100 close to the light-entering end 110 is formed as a wedge-shaped portion 150. The wedge-shaped portion 150 includes an inclined plane connected to other portions of the light plate 100 such as a flat portion; a thickness of the wedge-shaped portion 150 is greater than a thickness "h" of the flat portion 152. On the other hand, the trough 125 is preferably at least partially or completely located below the wedge-shape portion 150. For example, as the embodiment shown in FIG. 6A, the trough 125 extends over the wedge-shape portion 150 in the direction away from the light-entering end 110 and parallel to the bottom 120 and stops at the flat portion 152, but not limited thereto. Alternatively, the tough could be completely located under the wedge-shaped portion. In addition, the depth "d" of the trough 125 is preferably designed in accordance with the wedge-shaped portion 150 of the light guide plate 100, as shown in FIG. 6B, so that the light path "L" in the light guide plate 100 will not be affected by the trough 125 and the adhesive layer 300 disposed therein.

Although the preferred embodiments of present invention have been described herein, the above description is merely illustrative. The preferred embodiments disclosed will not limited the scope of the present invention. Further modification of the invention herein disclosed will occur to those skilled in the respective arts and all such modifications are deemed to be within the scope of the invention as defined by the appended claims.

What is claimed is:

1. A backlight module, comprising:
a light guide plate having a light-entering end and a bottom, wherein a plurality of troughs spaced at intervals are formed on a portion of the bottom connected to the light-entering end;
a light source module disposed corresponding to the light-entering end, wherein the light source module includes:
a substrate extending along the light-entering end, wherein a portion of the substrate protruding under the light-entering end parallelly extends below the bottom; and
a plurality of light sources disposed on the substrate and distributed along the light-entering end, wherein each of the light sources corresponds to an interval between the adjacent troughs; and
an adhesive layer attached onto a face of the substrate facing the bottom, and extending into the troughs to be attached to the light guide plate, wherein the adhesive layer extends between the adjacent light sources.

2. The backlight module of claim 1, wherein the adhesive layer includes a connecting portion and a plurality of finger portions, the connecting portion is disposed laterally at a rear side of the light sources relative to the light-entering end, the finger portions respectively extend from the connecting portion, respectively, and protrude into the corresponding troughs through the adjacent light sources.

3. The backlight module of claim 1, wherein a portion of the light guide plate connected to the light-entering end is formed as a wedge-shaped portion, a thickness of the wedge-shaped portion is greater than a thickness of the other portion of the light guide plate; each of the troughs is at least partially located below the wedge-shaped portion.

4. The backlight module of claim 3, wherein the troughs are completely located below the wedge-shaped portion.

5. The backlight module of claim 1, wherein each of the light sources has a light-emitting face, the trough is located outside a range of 110-degree opening angle of the light-emitting face in the light guide plate.

6. The backlight module of claim 1, wherein each of the light sources has a light-emitting face, the trough is located below a projection area of the light-emitting face on the light-entering end and outside the projection area.

7. The backlight module of claim 1, wherein a depth of the troughs parallel to the bottom is between 0.5 mm and 2 mm.

8. The backlight module of claim 1, wherein a height of the troughs perpendicular to the bottom is smaller than 0.085 mm.

9. The backlight module of claim 8, wherein the height of the troughs perpendicular to the bottom is smaller than 0.06 mm.

* * * * *

UNITED STATES PATENT AND TRADEMARK OFFICE
CERTIFICATE OF CORRECTION

PATENT NO. : 8,668,373 B2
APPLICATION NO. : 13/783341
DATED : March 11, 2014
INVENTOR(S) : Liu et al.

It is certified that error appears in the above-identified patent and that said Letters Patent is hereby corrected as shown below:

On the Title Page, item [54], please replace the title "BACKLIGHT MODULE HAVING A THINNED STUCTURE" with "BACKLIGHT MODULE HAVING A THINNED STRUCTURE"

Signed and Sealed this
Twenty-sixth Day of August, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,668,373 B2 | Page 1 of 1 |
| APPLICATION NO. | : 13/783341 | |
| DATED | : March 11, 2014 | |
| INVENTOR(S) | : Liu et al. | |

It is certified that error appears in the above-identified patent and that said Letters Patent is hereby corrected as shown below:

On the Title Page, item [54], and in the Specification, Column 1, lines 1-2, please replace the title "BACKLIGHT MODULE HAVING A THINNED STUCTURE" with "BACKLIGHT MODULE HAVING A THINNED STRUCTURE"

This certificate supersedes the Certificate of Correction issued August 26, 2014.

Signed and Sealed this
Sixteenth Day of September, 2014

Michelle K. Lee
*Deputy Director of the United States Patent and Trademark Office*